(12) United States Patent
Stein

(10) Patent No.: US 12,552,261 B2
(45) Date of Patent: Feb. 17, 2026

(54) METHOD FOR REDUCING A VIBRATION OF A VEHICLE BODY OF AN ELECTRIC VEHICLE BY MEANS OF THE ELECTRIC MOTOR OF SAID VEHICLE

(71) Applicant: Dr. Ing. h.c. F. Porsche Aktiengesellschaft, Stuttgart (DE)

(72) Inventor: Wolfgang Stein, Nagold-Vollmaringen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 115 days.

(21) Appl. No.: 18/121,056

(22) Filed: Mar. 14, 2023

(65) Prior Publication Data

US 2023/0322093 A1 Oct. 12, 2023

(30) Foreign Application Priority Data

Apr. 11, 2022 (DE) ..................... 10 2022 108 679.8

(51) Int. Cl.
*B60L 15/20* (2006.01)
*B60K 1/00* (2006.01)
*H02P 23/14* (2006.01)
*B60W 30/02* (2012.01)

(52) U.S. Cl.
CPC ............. *B60L 15/20* (2013.01); *B60K 1/00* (2013.01); *H02P 23/14* (2013.01); *B60L 2240/10* (2013.01); *B60L 2240/423* (2013.01)

(58) Field of Classification Search
CPC ....... B60L 15/20; B60W 30/02; B60W 10/22; B60W 10/08; G01M 17/04
See application file for complete search history.

(56) References Cited

U.S. PATENT DOCUMENTS

| 4,611,491 | A  | * | 9/1986 | Brown | ................ G01P 15/18 73/514.21 |
| 7,423,393 | B2 | * | 9/2008 | Wakao | ................ B60L 15/2045 318/434 |
| 8,840,118 | B1 | * | 9/2014 | Giovanardi | ......... F15B 13/0444 280/124.157 |

(Continued)

FOREIGN PATENT DOCUMENTS

DE 102017116733 1/2019
DE 10201102017120175 3/2019

*Primary Examiner* — Tan Q Nguyen
(74) *Attorney, Agent, or Firm* — LEYDIG, VOIT & MAYER, LTD.

(57) ABSTRACT

A method uses the electric motor (4) of an electric vehicle to reduce vibration of the vehicle body (1). The electric motor (4) is supported on the vehicle body (1) or on the subframe (2) of the electric vehicle. The method includes determining a vibration of a subframe (2) or of the vehicle body (1) in the area of force introduction sites where electric motor (4) is supported. The method proceeds by determining a torque required to be generated by the electric motor (4) to introduce a force into the subframe (2) or into the body (1) for counteracting the force caused by the determined oscillation acting on the subframe (2) or the vehicle body (1) and adjusting at least one driving signal of the electric motor (4) such that the required torque is generated based on the change in the drive torque of the electric motor (4).

19 Claims, 1 Drawing Sheet

(56) References Cited

U.S. PATENT DOCUMENTS

| | | | |
|---|---|---|---|
| 11,708,109 B2* | 7/2023 | Hirao | B60G 15/02 |
| | | | 701/41 |
| 2006/0076740 A1* | 4/2006 | Sugiyama | B60L 7/00 |
| | | | 280/5.502 |
| 2011/0266760 A1 | 11/2011 | Itabashi | |
| 2014/0046558 A1* | 2/2014 | Kim | B60W 10/04 |
| | | | 701/54 |

* cited by examiner

METHOD FOR REDUCING A VIBRATION OF A VEHICLE BODY OF AN ELECTRIC VEHICLE BY MEANS OF THE ELECTRIC MOTOR OF SAID VEHICLE

CROSS REFERENCE TO RELATED APPLICATION

This application claims priority on German Patent Application No 10 2022 108 679.8 filed Apr. 11, 2022, the entire disclosure of which is incorporated herein by reference.

BACKGROUND

Field of the Invention

The invention relates to a method for reducing vibration of a vehicle body of an electric vehicle by means of the electric motor of the vehicle.

Related Art

Noise levels while traveling in a passenger compartment of a vehicle are important quality criteria, both for vehicles with an internal combustion engine and those with an electric motor. Passengers in luxury vehicles are accustomed to having a high attenuation of all external noises, such as noise from other vehicles. Acoustic tuning of a vehicle gives great attention to noises generated by the vehicle itself during movement, such as air noise or engine noise, so that these noises penetrate as little as possible into the passenger compartment.

Noise caused by contact of the tires with the roadway permanently accompanies a moving vehicle. Roadway excitation caused by potholes, bumps, and small imperfections in the roadway surface stimulate vibrations in a vehicle tire and the associated axle, thereby introducing forces into the body structure. These forces lead to excitation of the body and thus to vibrations in the body, including components such as the tailgate.

The vibrating surfaces of the body stimulate the air space in the vehicle interior and lead to increased air noise levels in the passenger compartment. This phenomenon is known as rumbling tire noise and is unpleasant to vehicle occupants.

In light of this, an object of this invention is to reduce the noise in a passenger cabin of a vehicle, or even avoiding such noise altogether in the optimum case.

SUMMARY

The invention relates to an electric vehicle with an electric motor that is used as a power unit of the electric vehicle. The electric motor is supported on the vehicle body or on the subframe of the vehicle and is configured to introduce forces into supporting parts of the vehicle body or the subframe to counteract forces introduced by the roadway excitation via the tire, the axle on which the tire is supported, and via the subframe into the vehicle body. More particularly, an applied drive torque of the electric motor during travel is changed such that a force generated by the drive torque change is aligned oppositely at points of action of the force originating from the roadway excitation. The required torque is dimensioned so that the force input into the body is minimized. Consequently, the vibration of the body and thus the airborne sound inside the passenger compartment is minimized.

There are two different scenarios that can be differentiated. In a first scenario, the electric motor is supported on or attached to the vehicle body, and the subframe is excited by the roadway via the vehicle wheels supported on the subframe. Thus, the subframe vibrates and transmits vibrations to the body. By determining the vibration of the body at or near the area of the force introduction sites or the subframe, the influence of the excited subframe on the vehicle body can be quantified. The force introduction sites include locations where the subframe transfers forces to the vehicle body via a bearing. By generating a matching compensating drive torque resulting from the change in the drive torque currently generated by the electric motor, a force can be generated that is opposite to the force introduced into the vehicle body by the subframe. These compensating forces minimize the vibration of the body, and thus reduce the air noise in the passenger compartment that would have been caused by those vibrations.

In a second scenario, the electric motor is supported on or attached to the subframe and is excited by the roadway via the vehicle wheels supported thereon. Again, the subframe in this case is supported resiliently on the vehicle body and transmits vibrations to the vehicle body. The force acting on the subframe can be determined by determining the vibration of the subframe, either on the vehicle body, as described in the first scenario, or on the subframe itself. The electric motor also is attached to the subframe and can generate a matching compensating drive torque resulting from the change in the drive torque currently generated by the electric motor. Thus, a force can be generated that is equal but opposite to the force acting on the subframe. This compensating force minimizes the vibration of the subframe and thereby minimizes the transfer of forces to the body of the electric vehicle. Ultimately, the vibration of the vehicle body and thus the airborne sound in the passenger compartment is minimized.

Minimizing the vibration of the body can be understood to mean minimizing the vibrational fractions in the frequency spectrum of the vibration of the body, including components, such as the tailgate. Thus, a propagation of a vibration via the body of the electric vehicle is prevented by minimizing a transfer of vibrations from the subframe of the electric vehicle to its body thereby reducing sound generation in the interior of the vehicle.

Accordingly, the method of the invention uses the electric motor of an electric vehicle to reduce vibration of the body of the vehicle. The electric motor is the motor that drives the electric vehicle and is powered by power electronics from the traction battery.

The method comprises determining a vibration of a subframe, or determining a vibration of the vehicle body in the area of the force introduction locations by the subframe, when the electric motor is mounted on the vehicle body or when the electric motor is mounted on the subframe. These two cases correspond to the two previously described scenarios regarding the options for supporting the electric motor on the electric vehicle. Determining the vibration can mean sensing the vibrational response and can comprise sensing a frequency spectrum of the vibrational movement of the object as determined by suitable sensors.

The method further comprises determining a required moment of the electric motor to introduce a force into the subframe or into the vehicle body to counteract the force caused by the determined vibration and acting on the subframe or vehicle body. The required torque is a drive torque, but in most cases the determined torque has an amplitude that is significantly smaller than the drive torque currently generated by the electric motor for propulsion of the electric vehicle. For example, a conversion table can be used to convert a drive torque of the electric motor to a resulting force applied to the vehicle body or the subframe, and the values can be determined by calculation or experimental determination. Alternatively, typical rule approaches can be used instead of an implementation table.

The drive torque of the electric motor transfers a torque to the component on which the electric motor is mounted, i.e., the vehicle body or the subframe. Equal but oppositely directed forces are introduced into the component at each of the front and back (with respect to the vehicle's longitudinal axis) bearing points of the electric motor, the entirety of which act as a torque. In this context, it is assumed that the rotational impetus of the rotor of the electric motor is perpendicular to the vehicle's longitudinal axis. Due to this spatial arrangement of the electric motor in the electric vehicle, only pitching movements of the vehicle body or the subframe can be countered using the method. A lifting movement of the entire vehicle cannot be counteracted.

The method further comprises adjusting at least one driving signal of the electric motor such that the required torque is generated based on the change in the drive torque of the electric motor. The at least one driving signal can be a torque-forming current component of the electric motor.

In further embodiments, the vibration can be determined by at least two sensors, such as accelerometers. The determined acceleration includes the polarity of the oscillation, which is decisive for the opposite-phase force initiation by the electric motor. Thus, the method can be performed based on determined accelerations.

In further embodiments, the at least two sensors can be arranged in various positions on the subframe or the vehicle body relative to a longitudinal axis of the vehicle. For example, a sensor can be arranged on or near a front portion of the subframe or a front bearing point of the subframe on the body, and the second sensor may be arranged at or near a rear portion of the subframe or a rear bearing point of the subframe on the vehicle body.

In further embodiments, the at least two sensors can be arranged at bearing points of the subframe on the vehicle body or at a distance of a maximum of 30 cm away. Generally, the closer the sensors are to the body at the bearing points of the subframe, the more accurately the vibration transmitted from the subframe to the vehicle body can be determined.

In further embodiments, determining the vibration can comprise sensing vibration frequencies in the range of 30 Hz to 40 Hz. For this purpose, the determined frequency spectrum can be filtered by a band pass filter to capture only the oscillation range relevant to the method. Sound waves in the range of approximately 30 Hz to approximately 40 Hz are perceived as a rumbling noise in the interior of the vehicle by the occupants.

In further embodiments of the method, determining the vibration can further comprise subtracting the vibration signals output by the at least two sensors from each other. By subtracting a signal coming from a sensor arranged on a front part of the subframe, or near a front bearing point of the subframe on the vehicle body from a signal coming from a sensor arranged on a rear part of the subframe, or near a rear bearing point of the subframe, rectified accelerations representing a lifting movement of the vehicle can be eliminated efficiently since such a signal cannot easily be counteracted without the method presented herein. Thus, a pitching movement of the subframe or vehicle body is emphasized. Therefore, subtracting the sensor signals from each other optimizes the target signal to determine the required torque.

The vibration can be determined by at least four sensors, where an equal number of sensors being arranged on right and left sides of the electric vehicle relative to a longitudinal axis extending centrally through the vehicle. In other words, the sensors for detecting the vibration of the subframe or the vehicle body can be present in an axis-symmetrical arrangement, and the axis of symmetry can correspond to the centrally arranged longitudinal axis of the vehicle.

In some embodiments, determining the vibration can comprise an average of the signals determined on the right and on the left side of the vehicle corresponding to each other in terms of their position relative to the longitudinal axis of the vehicle. Thus, the signals can be averaged by those sensors on the left and right sides of the vehicle that are arranged at the same height along the longitudinal axis.

The invention also relates to an electric vehicle having an electric motor that is supported on a subframe or on the vehicle body. The electric vehicle comprises at least two sensors arranged on either the subframe or on the vehicle body in the area of the force introduction sites, such as force introduction sites via the subframe. A control circuit is connected to the at least two sensors and to a control unit of the electric motor. The control circuit is designed to perform the method described above.

The aforementioned features and the features described below can be used in the specified combination, in other combinations or on their own, without departing from the scope of the invention. Additional advantages and embodiments of the invention follow from the description and the enclosed drawings.

DETAILED DESCRIPTION

Figure 1:
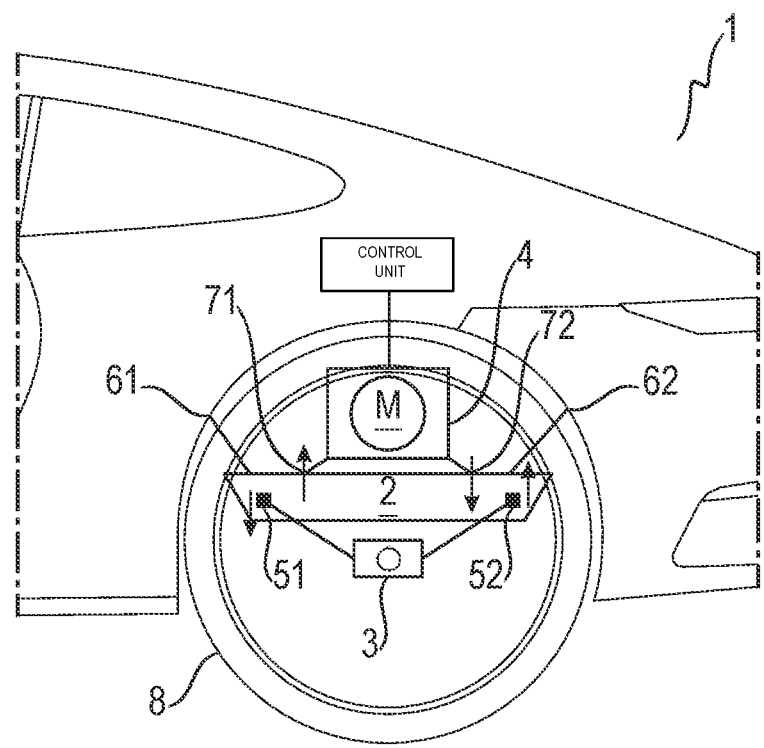
FIG. 1 is a schematic representation of a rear of the vehicle with a subframe and an electric motor supported thereon.

FIG. 1 is a schematic illustration of a rear portion of a vehicle body 1 having a subframe 2 and an electric motor 4 supported thereon. A wheel suspension 3 is supported on the subframe 2. The subframe 2 itself is in turn supported at the rear of the vehicle body 1. The black lines, not explicitly marked with reference numerals, represent connecting elements between the respective units specified.

While traveling, vibrations are stimulated via the roadway by movement of the tires or the wheel 8 and the axle that is supported on the subframe 2. The oscillations are transferred to the subframe 2 at the first axle bearing point 51 and the second axle bearing point 52. Since a total torque is transferred to the subframe 2, the force acting at the first axle bearing point 51 is opposite to the force acting at the second axle bearing point 52. Both forces (and further forces mentioned below) are represented by corresponding force arrows. Generally, i.e., without application of the method according to the invention, these forces transfer from the subframe 2 to the vehicle body at the first subframe bearing point 61 and the second subframe bearing point 62.

However, as part of the method of the invention, vibration of the subframe 2 is determined or detected. A required torque of the electric motor 4 then is determined to introduce a force into the subframe 2, which at least partially counteracts the force caused by the determined vibration and acting on the subframe 2. FIG. 1 represents this compensatory force in the form of the two oppositely directed force arrows that are transferred to the subframe 2 at the first engine bearing point 71 and the second engine bearing point 72. The compensatory force is generated by adjusting at least one driving signal of the electric motor 2 such that the required moment is generated from the change in the drive torque of the electric motor 4 to produce the two forces acting at the first and second engine bearing points 71, 72. These forces are opposed to the forces acting on the subframe at the first and second axle bearing points 51, 52 and are large enough to minimize the oscillation behavior of the subframe 2 or to completely suppress those forces in the optimal case. As a result, the subframe 2 does not transfer forces to the vehicle body 1 at the first and second subframe bearing points 61, 62.

To determine the forces or vibrations, corresponding sensors, e.g. accelerometers, can be arranged at all bearing points shown in FIG. 1. A control circuit is configured to perform the method of the invention and is connected to the sensors and to a control unit of the electric motor 4. In the context of the invention, a "control unit" can, for example, be a machine or an electronic circuit or a powerful computer. A control unit can be a central processing unit (CPU), a microprocessor or a microcontroller, for example an application-specific integrated circuit or a digital signal processor, possibly in combination with a storage unit for storing program commands, etc. A control unit also can be a virtualized processor, a virtual machine or a soft CPU and may be a programmable processor that is equipped with configuration steps for carrying out the method according to the invention or is configured with configuration steps so that the programmable processor realizes features according to the method, the control circuit, the sensors, or of other aspects and/or partial aspects of the invention. Furthermore, the system may have highly parallel computing units.

Figure 2:
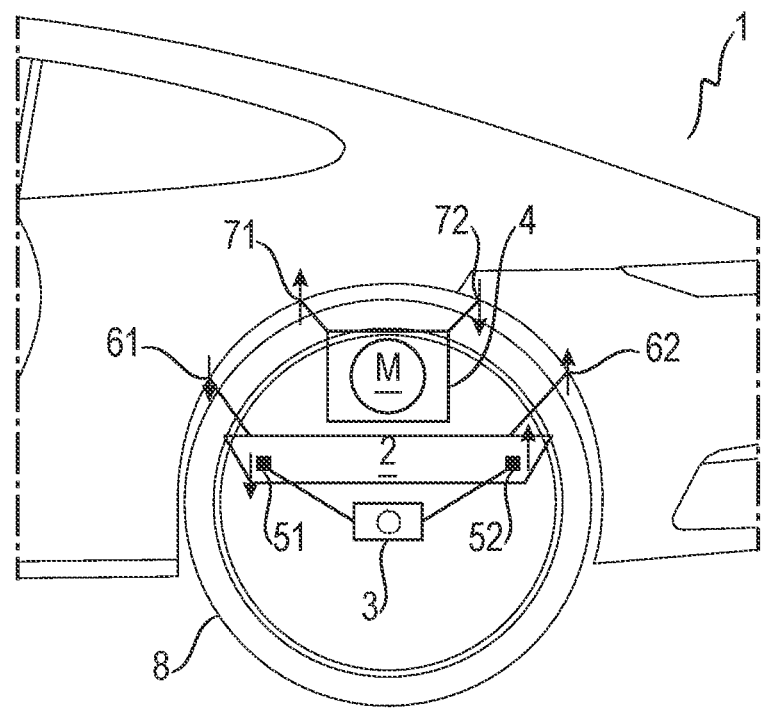
FIG. 2 is a schematic illustration of a rear of the vehicle with a subframe and an electric motor supported on the vehicle body.

FIG. 2 shows a scenario slightly modified compared to FIG. 2, in which the electric motor 4 is mounted not on the subframe 2, but directly on the vehicle body 1. Otherwise, the remaining structure corresponds to the structure shown in FIG. 1, so the same reference signs are used for the same elements without describing them again.

In a vehicle designed in this way, an introduction of forces from the vehicle body 2 to the vehicle body inevitably takes place at the first and second subframe bearing points 61, 62, thereby causing the vehicle body 1 to vibrate. To minimize the effects of the induction of force of the subframe 2 on the vehicle body 1, drive torque change (required torque) creates compensatory forces at the first and second engine bearing points 71, 72. Compared to the vehicle body illustrated in FIG. 1, these forces then are located on the vehicle body 1 and not on the subframe 2.

In the two scenarios shown in FIGS. 1 and 2, compensatory forces are generated by the targeted generation of a torque in addition to the currently applied regular drive torque, which counteract the forces acting on the subframe 2 (FIG. 1) or the forces introduced by the subframe 2 on the vehicle body 1 (FIG. 2). As a result, the vibration of the vehicle body 2, at least in a predetermined target frequency range, and thus ultimately the airborne sound created in the passenger compartment, is minimized.

The invention claimed is:

1. A method for reducing a vibration of a vehicle body (1) of an electric vehicle by using an electric motor (4) of the vehicle, the electric motor (4) being supported on the vehicle body (1) or on a subframe (2) of the electric vehicle, the electric vehicle further having a first wheel with a wheel suspension (3) supports on the subframe (2), the method comprising:
    determining a vibration of the subframe (2) or the vehicle body (1) in areas of first and second force introduction sites to the subframe (2) or the vehicle body (1), the first and second force introduction sites being disposed respectively forward and rearward of the wheel suspension of the first wheel;
    determining a torque required to be generated by the electric motor (4) to introduce forces into the subframe (2) or into the body (1) to counteract forces caused by the determined vibration acting on the subframe (2) or the vehicle body (1), at the first and second force introduction sites;
    adjusting at least one driving signal of the electric motor (4) such that the torque required to counteract the forces caused by the determined vibration is generated by the electric motor (4).

2. The method of claim 1, wherein determining the vibration comprises sensing vibration frequencies in a range of 30 Hz to 40 Hz.

3. The method of claim 1, wherein the vibration is determined by at least first and second sensors.

4. The method of claim 3, wherein the at least first and second sensors are accelerometers.

5. The method of claim 3, wherein the at least first and second sensors are arranged on the subframe (2) or the vehicle body (1) at least at first and second positions spaced apart along a longitudinal axis of the electric vehicle.

6. The method of claim 3, wherein the at least first and second sensors are arranged at bearing points of the subframe (2) on the vehicle body (1).

7. The method of claim 3, wherein the at least first and second sensors are at maximum distance of 30 cm from bearing points of the subframe (2) on the vehicle body (1).

8. The method of claim 3, wherein determining the vibration further comprises subtracting from one another vibration signals output respectively by the at least first and second sensors.

9. The method of claim 1, wherein the first and second sensors are on a left side of the electric vehicle, and the electric vehicle further has third and fourth sensors arranged on a right side of the electric vehicle relative to a longitudinal axis running centrally through the electric vehicle.

10. The method of claim 9, wherein determining the vibration comprises averaging the signals determined on the right side and on the left side of the vehicle corresponding to one another in terms of their position relative to the longitudinal axis of the vehicle.

11. An electric vehicle comprising:
    a vehicle body (1), a subframe (2) and a wheel having a wheel suspension mounted to the subframe at positions forward and rearward of the wheel suspension relative to a longitudinal axis running centrally through the electric vehicle;
    an electric motor (4) supported on the subframe (2) or on the vehicle body (1);
    first and second sensors arranged on at least one of the subframe (2) or on the vehicle body (1) in areas of force introduction sites via the subframe (2), the first and second sensors being disposed at respective positions forward and rearward of the wheel suspension relative to a longitudinal axis and being configured for determining a vibration of the subframe (2) or the vehicle body (1) in the area of the force introduction sites;

a control circuit connected to the sensors and to a control unit of the electric motor (4), the control unit being configured to determine a torque required to be generated by the electric motor (4) to introduce a force into the subframe (2) or into the body (1) to counteract the force caused by the determined vibration acting on the subframe (2) or the vehicle body (1), and adjusting at least one driving signal of the electric motor (4) such that the torque required to counteract the force caused by the determined vibration is generated by the electric motor (4).

12. The electric vehicle of claim 11, wherein the sensors are configured for sensing vibration frequencies in a range of 30 Hz to 40 Hz.

13. The electric vehicle of claim 11, wherein the sensors are accelerometers.

14. The electric vehicle of claim 13, wherein the at least two accelerometers are arranged at bearing points of the subframe (2) on the vehicle body (1).

15. The electric vehicle of claim 13, wherein the at least two accelerometers are at maximum distance of 30 cm from bearing points of the subframe (2) on the vehicle body (1).

16. The electric vehicle of claim 13, wherein the first and second sensors are arranged on a left side of the electric vehicle relative to a longitudinal axis running centrally through the electric vehicle and the electric vehicle further comprises third and fourth sensors arranged on a right side of the electric vehicle.

17. An electric vehicle comprising:

a vehicle body (1) and a subframe (2) supported on the vehicle body (1) at least at two bearing points (61, 62), the bearing points (61, 62) defining force introduction sites where vibrations of the subframe (2) are introduced into the vehicle body (1);

an electric motor (4) supported on the subframe (2) or on the vehicle body (1);

at least two accelerometers arranged on at least one of the subframe (2) and the vehicle body (1) in an area at maximum distance of 30 cm from the bearing points (61, 62) where the subframe (2) is supported on the vehicle body (1), the at least two accelerometers being configured for determining a vibration of the subframe (2) or the vehicle body (1) in the area of the force introduction sites;

a control circuit connected to the accelerometers and to a control unit of the electric motor (4), the control unit being configured to determine a torque required to be generated by the electric motor (4) to introduce a force into the subframe (2) or into the body (1) to counteract the force caused by the determined vibration acting on the subframe (2) or the vehicle body (1), and adjusting at least one driving signal of the electric motor (4) such that the torque required to counteract the force caused by the determined vibration is generated by the electric motor (4).

18. The electric vehicle of claim 17, wherein the at least two accelerometers are arranged at the bearing points (61, 62) of the subframe (2) on the vehicle body (1).

19. The electric vehicle of claim 17, wherein the at least two accelerometers comprise at least four accelerometers with equal numbers of the accelerometers being arranged on a right side and on a left side of the electric vehicle relative to a longitudinal axis running centrally through the electric vehicle.

* * * * *